United States Patent [19]
Kimura et al.

[11] Patent Number: 5,008,757
[45] Date of Patent: Apr. 16, 1991

[54] ELECTRONIC STILL CAMERA

[75] Inventors: Keita Kimura, Kawasaki; Tetsuya Yamamoto, Hasuda, both of Japan

[73] Assignee: Nikon Corporation, Tokyo, Japan

[21] Appl. No.: 393,131

[22] Filed: Aug. 14, 1989

[30] Foreign Application Priority Data

Aug. 24, 1988 [JP] Japan .................. 63-210072

[51] Int. Cl.⁵ .................. H04N 3/14; H04N 5/335; H04N 5/238; H04N 5/225
[52] U.S. Cl. .................. 358/213.13; 358/213.19; 358/909; 358/228
[58] Field of Search .................. 358/213.13, 213.15, 358/213.19, 228, 909

[56] References Cited

U.S. PATENT DOCUMENTS

| | | | |
|---|---|---|---|
| 4,603,354 | 7/1986 | Hashimoto | 358/213.13 |
| 4,635,126 | 1/1987 | Kinoshita | 358/213.19 |
| 4,695,888 | 9/1987 | Peterson | 358/213.13 |
| 4,779,137 | 10/1988 | Tojo | 358/213.19 |
| 4,833,536 | 5/1989 | Okino | 358/228 |

Primary Examiner—James J. Groody
Assistant Examiner—Wendy R. Greening
Attorney, Agent, or Firm—Shapiro and Shapiro

[57] ABSTRACT

An electronic still camera comprises a photoelectric converting device for converting light from an object into an electrical signal; an amplifying-recording device for amplifying the electrical signal and for recording the amplified signal on a recording medium; a selecting device for selecting one of plural amplification gains so that the amplifying-recording device amplifies the electrical signal on the basis of the selected amplification gain; an exposure time in accordance with the selected amplification gain and the luminance of an object to be photographed; and a determining device for determining a longest permissible exposure time, irrespective of the luminance of the object, in accordance with the selected amplification gain. If the calculated exposure time is longer than the longest permissible exposure time, an alarm is given and/or the calculated exposure time is reduced.

6 Claims, 2 Drawing Sheets

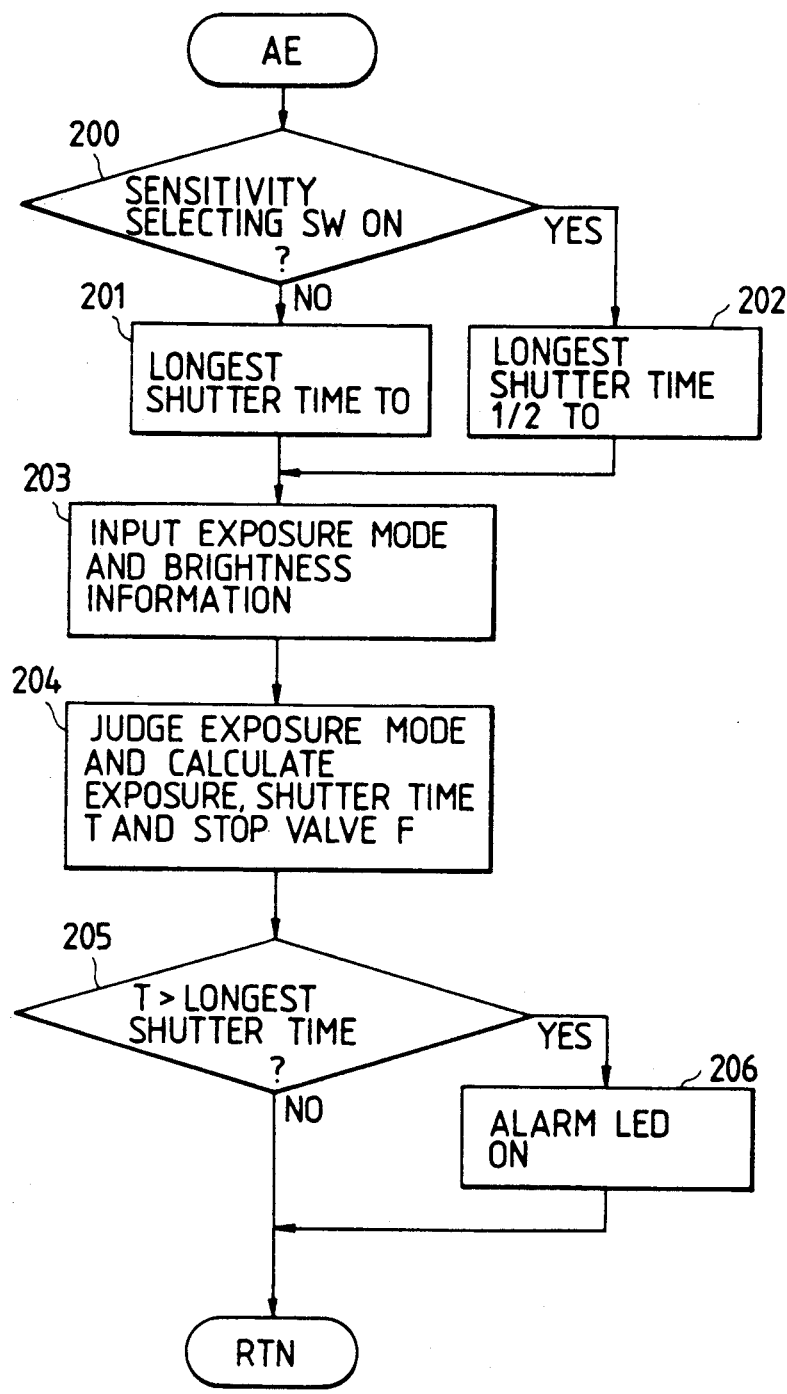

ELECTRONIC STILL CAMERA

BACKGROUND OF THE INVENTION

1. Field of the Invention

The present invention relates to an electronic still camera.

2. Related Background Art

In a video camera or an electronic still camera, the image is photoelectrically converted into an electrical signal, which is recorded after signal processing such as amplification, modulation etc. In the amplification of the electrical signal, a change in the gain of amplification is equivalent to a change in the sensitivity of the camera. A faster shutter speed achieved by an increased photographing sensitivity of the camera is effective for preventing the undesirable effect of camera vibration or for photographing a moving object, and a camera with sensitivity increased by such method is already known.

However, if the gain is increased in the processing circuit for the output signal of a solid-state image sensor for photoelectric conversion of the image, for the purpose of equivalent increase of the sensitivity of the image sensor (hereinafter called sensitivity increase), noise is also amplified together with the image signal, thus reducing the S/N ratio of the image signal.

A major cause of such noise is the dark current of the solid-state image sensor. Such dark current noise increases substantially proportionally to the charge accumulating time (hereinafter called exposure time, as the accumulating time is substantially equal to the exposure time in case of a long exposure time) of the solid-state image sensor. In electronic still cameras with variable exposure time for the solid-state image sensor, the maximum exposure time of the solid-state image sensor is generally selected as long as possible within a range in which the dark current noise is not conspicuous. Under such setting, the dark current noise is not too conspicuous and tolerable as long as the exposure time T of the solid-state image sensor satisfies a condition $T \leq T_0$, where $T_0$ is the maximum exposure time (longest permissible exposure time) of the solid-state image sensor defined as explained above, but the dark current noise becomes too conspicuous and intolerable under a condition $T > T_0$. In case the ordinary gain $A_0$ of the processing circuit for the output signal of the solid-state image sensor is increased to $kA_0$ ($k > 1$; where K is a constant) for the purpose of sensitivity increase, the level of the dark current noise also increases k times. The dark current noise $N_0$ at the maximum exposure time $T_0$ of the solid-state image sensor and at the above-mentioned gain $A_0$ can be represented, at a given temperature, by:

$$N_0 = mA_0T_0 \tag{1}$$

wherein m is a constant. As explained above, the dark current noise up to the level $N_0$ is tolerable. The dark current noise $N_1$ at the maximum exposure time $T_0$ and at an increased gain $kA_0$ for sensitivity increase can be represented, at the given temperature, by:

$$N_1 = mkA_0T_0 \tag{2}$$
$$= kN_0$$

wherein k is a constant larger than unity. Thus the S/N ratio of the image signal is reduced by a factor of 1/k, and the dark current noise becomes intolerable. This problem can be prevented by selecting a maximum exposure time permissible for the highest sensitivity and using that exposure time for all the values of sensitivity, but, in such case, the longer exposure time that should have been usable at a lower sensitivity becomes unusable, so that the range of exposure time becomes limited.

SUMMARY OF THE INVENTION

In consideration of the foregoing, an object of the present invention is to enable a photographing operation in the electronic still camera, without limiting the exposure time range of the solid-state image sensor and without concern for the deterioration in S/N ratio resulting from the sensitivity increase.

The above-mentioned object can be attained, according to the present invention, by a structure in which the maximum exposure time of the solid-state image sensor is automatically reduced by a factor of 1/k when the gain of amplification of the above-mentioned signal processing circuit is increased k times.

As explained above, the dark current noise $N_0$ at the maximum exposure time $T_0$ of the solid-state image sensor and the gain $A_0$ of the signal processing circuit for the solid state image sensor can be represented by:

$$N_0 = mA_0T_0 \tag{1}$$

wherein m is a constant. Also the dark current noise $N_1$ at the maximum exposure time $T_0$ and at a gain $kA_0$ is represent by:

$$N_1 = mkA_0T_0 = kN_0 \tag{2}$$

It is assumed that the noise is tolerable up to the level $N_0$ but not at the level $N_1$. However, by selecting a maximum exposure time $(1/k)T_0$ for a gain increased by k times, the dark current noise $N_2$ in this state is represented by:

$$N_2 = mkA_0 \frac{1}{k} T_0 = mA_0T_0 = N_0 \tag{3}$$

so that the noise $N_2$ is in the tolerable range.

Thus, by selecting the longest exposure time of 1/k times $T_0$ for a sensitivity increase of k times, the S/N ratio at the longest exposure time can be maintained at the same level as that of the standard sensitivity.

BRIEF DESCRIPTION OF THE DRAWINGS

FIG. 2 is a flow chart of a program executed by a CPU in the embodiment shown in FIG. 1.

DESCRIPTION OF THE PREFERRED EMBODIMENTS

Figure 1:
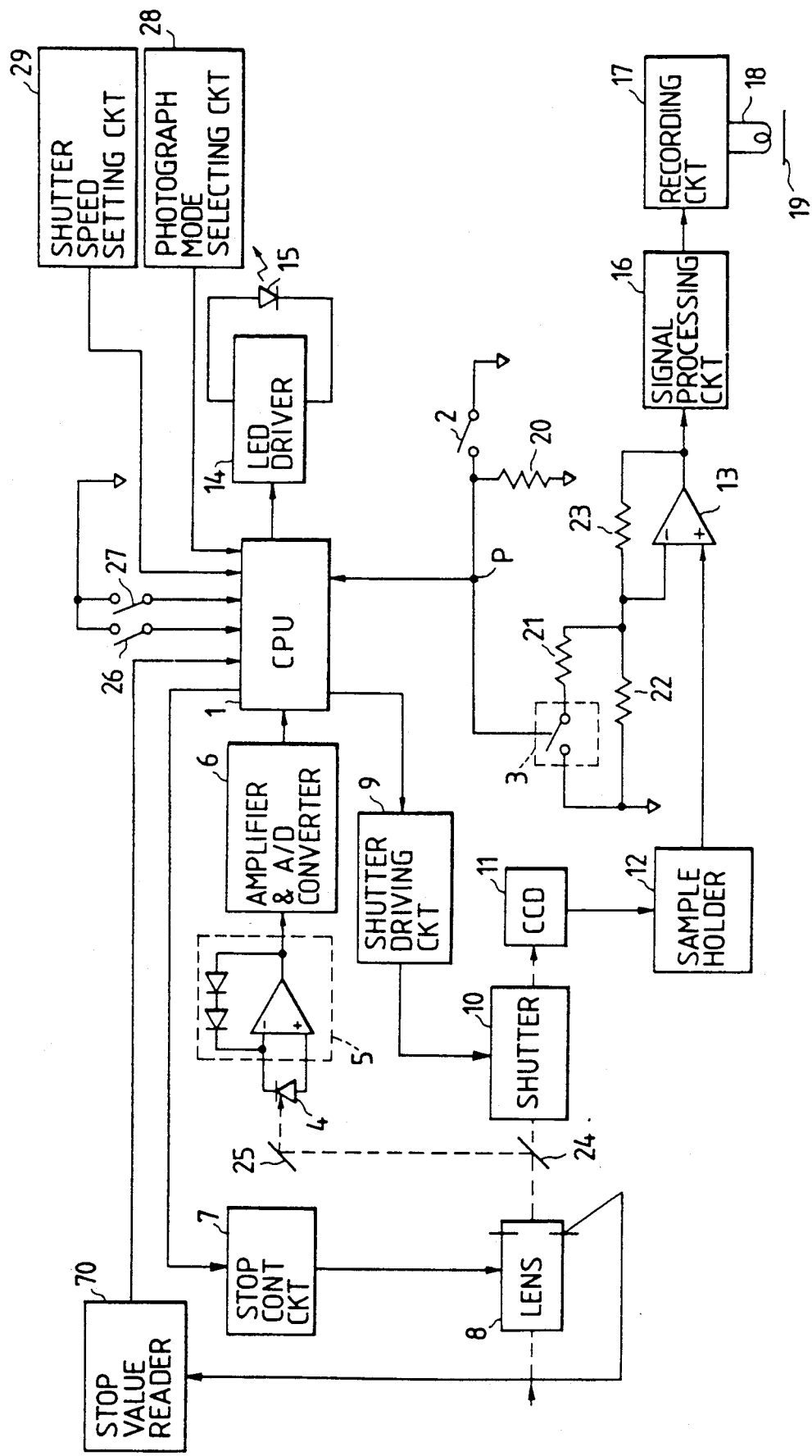
FIG. 1 is a block diagram of an electronic still camera embodying the present invention.

FIG. 1 shows an embodiment of the present invention. A sensitivity increase switch 2 selects a sensitivity $S_0$ or a doubled sensitivity $2S_0$ respectively in the off or on state, and is linked with an analog switch 3 which is turned on or off respectively when the sensitivity increase switch 2 is on or off. The analog switch 3 selects whether or not to connect a resistor 21 between the inverted input terminal (−) and the common terminal of an operational amplifier 13, and resistor 21 has a resistance the same as that of a resistor 22 connected between the inverted input terminal (−) and the common terminal. The gain of the operational amplifier 13 is determined by the resistor(s) 22 (and 21) and a negative feedback resistor 23. A CPU 1 executes automatic exposure control in a diaphragm preferential auto exposure mode, a program auto mode or a manual exposure mode, according to the instruction from a photographing mode selecting circuit 28. In the diaphragm preferential auto exposure mode, the luminance information of the object is obtained from a photodiode 4 receiving the light from the object through a lens 8, a quick-return mirror 24 and a reflector 25. The CPU 1 receives that information after logarithmic compression by a logarithmic converter 5, and amplification and digitizing in an amplifier-A/D converter 6. It also receives information on the diaphragm stop value from a stop value reader 70 for reading the stop value of the diaphragm of the lens 8, and information on sensitivity from the potential at a point P, governed by the on/off state of the sensitivity increase switch 2, and determines the shutter speed from an exposure calculation. In the program auto exposure mode, the CPU 1 determines the diaphragm stop value and the shutter speed through an exposure calculation based on the luminance information and the sensitivity information mentioned above. The CPU 1 selects the longest shutter time as $T_0$ or $T_0/2$ respectively when the sensitivity increase switch 2 is off or on. If the shutter time determined in the exposure calculation is longer than thus defined longest shutter time, the CPU 1 activates an LED driver 14, in the diaphragm preferential auto exposure mode, to provide a warning that the exposure condition is out of the auto range, by an LED 15. In the program auto exposure mode, the CPU 1 so opens the diaphragm as to bring the shutter time equal to the longest shutter time, or, if the diaphragm cannot be opened in such a manner, activates the LED driver 14 to provide an out-of-range warning by the LED 15.

In the manual exposure mode, the diaphragm stop value obtained from the stop value reader 70 and the shutter speed obtained from a shutter speed setting circuit 29 are used for exposure without change, and the shutter speed is not limited at the longer side, because of the nature of the manual mode.

The light from the object, transmitted by the objective lens 8, passes through the position of the quick-return mirror 24, and irradiates the light-receiving face of a CCD 11 during the opening period of a shutter 10. The time-sequential signal from the CCD 11 is transmitted by a sample holding circuit 12, then introduced in the non-inverted input (+) of the operational amplifier 13 for amplification therein, further guided through a signal processing circuit 16 and a recording circuit 17 and is recorded on a floppy disk 19 by means of a magnetic head 18, in the already known manner.

When a power switch 26 is turned on, luminance information of the object is supplied to the CPU 1 through the photodiode 4, logarithmic converter 5, and amplifier-A/D converter 6. The CPU 1 determines the exposure values by an exposure calculation corresponding to the photographing mode selected by the mode selecting circuit, suitably based on the stop value information of the lens 8 from the stop value reader 70 and the shutter speed information from the setting circuit 29, and also based on the potential of the point P, which is governed by the on/off state of the sensitivity increase switch 2 and assumes a common potential or the power supply potential respectively when switch 2 is on or off.

When a shutter release switch 27 is closed, the CPU 1 drives the diaphragm and the shutter 10 according to the above-mentioned exposure values, thus taking the image of the object with the CCD 11. The image information taken by the CCD 11 is released therefrom as a time-sequential output signal, which is subjected to sample holding in the sample holding circuit 12, amplification in the operational amplifier 13, and signal processing such as gamma conversion in the signal processing circuit 16, and is supplied to the recording circuit 17. The signal is then converted, in circuit 17, into a video signal by synthesis with a synchronization signal, then modulated and recorded by the magnetic head 18 onto the magnetic disk 19. The gain of operational amplifier 13 is defined by $R_F/R_S$ when the sensitivity increase switch 2 is off, but is doubled to $2R_F/R_S$ when switch 2 is on, corresponding to a doubled sensitivity of the camera, wherein $R_S$ is the resistance of the resistor 21 or 22 and $R_F$ is the resistance of the resistor 23, which is assumed to be sufficiently larger than that of the resistor 21 or 22.

FIG. 2 is a flow chart of a program to be executed by the CPU 1 for setting the longest shutter time in relation to the change in sensitivity according to the present invention.

At first there is discriminated whether the sensitivity increase switch 2 is turned on (step 200), and, if not, the longest shutter time is selected as the predetermined value $T_0$ (step 201). If switch 2 is on, the longest shutter time is set at $T_0/2$ (step 202). Then a step 203 reads the luminance information and the photographing mode, and the diaphragm stop value in the diaphragm preferential mode, and a step 204 calculates the shutter speed T (in case of diaphragm preferential auto exposure mode), or the shutter speed T and the stop value F (in case of program auto exposure mode). Then a step 205 discriminates whether the calculated shutter time T is longer than the longest shutter time, and, if longer, a step 206 sends a signal to the LED driver 14 for turning on the LED 15 for warning. If not longer, the calculated shutter time is considered acceptable, and the CPU prepares for shutter releasing.

In the foregoing explanation, the sensitivity increase switch is to merely double the sensitivity, but it is also possible to change the sensitivity in several levels or to continuously vary the sensitivity, and the CPU 1 can calculate the longest exposure (shutter) time according to thus selected sensitivity. The calculation is to determine the longest exposure time as $T_0/k$ for a sensitivity increase of k times, wherein $T_0$ is the longest exposure time for the standard sensitivity, determined in consideration of the specifications of the solid-state image sensor and the tolerable quality of the image.

As explained in the foregoing, the present invention automatically reduces the longest exposure time of the solid-state image sensor by a factor of $1/k$ in response to a sensitivity increase of k times, so that the operator can execute the photographing operation without concern for the exposure time in case of a sensitivity increase. This fact is particularly advantageous in the program auto exposure mode or in the diaphragm preferential auto exposure mode. Also in a camera which does not display the shutter speed determined by the exposure calculation, the operator can assuredly use the increased sensitivity for preventing the undesirable effect of camera vibration or for photographing a moving object.

Also the present invention allows to fully exploit the exposure range of the solid-state image sensor at any sensitivity.

What is claimed is:

1. An electronic still camera, comprising:
   photoelectric converter means for converting light from an object into an electrical signal;
   amplifying-recording means for amplifying said electrical signal and for recording the amplified signal on a recording medium;
   selecting means for selecting one of plural amplification gains so that said amplifying-recording means amplifies said electrical signal on the basis on the selected amplification gain;
   calculating means for calculating an exposure time for said photoelectric converter means in accordance with the selected amplification gain and the luminance of an object to be photographed;
   determining means for determining a longest permissible exposure time, irrespective of the luminance of an object to be photographed, in accordance with the selected amplification gain; and
   alarm means for detecting that the calculated exposure time is longer than the longest permissible exposure time and generating an alarm signal.

2. An electronic still camera, comprising:
   photoelectric converter means for converting light from an object into an electrical signal;
   amplifying-recording means for amplifying said electrical signal and for recording the amplified signal on a recording medium;
   selecting means for selecting one of plural amplification gains so that said amplifying-recording means amplifies said electrical signal on the basis of the selected amplification gain; and
   determining means for determining a longest permissible exposure time, irrespective of the luminance of an object to be photographed, in accordance with the selected amplification gain.

3. An electronic still camera according to claim 2, wherein said selecting means has a manual operating member and selects one of said plural amplification gains by the operation of said member.

4. An electronic still camera according to claim 2, which further comprises calculating means for calculating an exposure time for said photoelectric converter means in accordance with the selected amplification gain and the luminance of an object to be photographed, and comparing means for comparing the calculated exposure time with said longest permissible exposure time.

5. An electronic still camera according to claim 4, wherein if said comparing shows that the calculated exposure time is longer than the longest permissible exposure time, said comparing means causes an alarm signal to be generated.

6. An electronic still camera according to claim 4, wherein if said comparing shows that the calculated exposure time is longer than the longest permissible exposure time, said comparing means causes the calculated exposure time to be reduced.

* * * * *